United States Patent
Oveis Gharan et al.

(10) Patent No.: US 11,038,599 B1
(45) Date of Patent: Jun. 15, 2021

(54) NONLINEAR DIGITAL SIGNAL PROCESSING FOR ADDITIVE NOISE REMOVAL

(71) Applicants: Shahab Oveis Gharan, Ottawa (CA); Kim B. Roberts, Ottawa (CA)

(72) Inventors: Shahab Oveis Gharan, Ottawa (CA); Kim B. Roberts, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/064,910

(22) Filed: Oct. 7, 2020

(51) Int. Cl.
*H04B 10/00* (2013.01)
*H04B 10/61* (2013.01)
*H04B 17/391* (2015.01)

(52) U.S. Cl.
CPC ..... *H04B 10/6165* (2013.01); *H04B 10/6162* (2013.01); *H04B 10/6163* (2013.01); *H04B 10/6164* (2013.01); *H04B 17/391* (2015.01)

(58) Field of Classification Search
CPC ............ H04B 10/6165; H04B 10/6162; H04B 10/6163; H04B 10/6164; H04B 17/391
USPC ........................................................ 398/208
See application file for complete search history.

(56) References Cited

U.S. PATENT DOCUMENTS

| | | | |
|---|---|---|---|
| 7,606,498 B1 | 10/2009 | Wu et al. | |
| 7,627,252 B2 | 12/2009 | Sun et al. | |
| 7,684,712 B1 | 3/2010 | Roberts et al. | |
| 7,756,421 B2 | 7/2010 | Roberts et al. | |
| 8,385,747 B2 | 2/2013 | Roberts et al. | |
| 8,718,491 B2 | 5/2014 | Khandani et al. | |
| 8,781,317 B1 | 7/2014 | Roberts | |
| 9,088,387 B2 | 7/2015 | Oveis Gharan et al. | |
| 9,143,238 B2 | 9/2015 | Roberts et al. | |
| 10,211,919 B2 | 2/2019 | Oveis Gharan et al. | |
| 2017/0099112 A1* | 4/2017 | Zamani | H04B 10/616 |
| 2019/0199443 A1* | 6/2019 | Zamani | H04B 10/614 |
| 2019/0334627 A1* | 10/2019 | Kaneda | H04B 10/6166 |

OTHER PUBLICATIONS

Li, et al., "Nonlinear Polarization Crosstalk Canceller for Dual-Polarization Digital Coherent Receivers", Optical Society of America, 2010, 2010.

(Continued)

*Primary Examiner* — Mohammad R Sedighian
(74) *Attorney, Agent, or Firm* — Integral Intellectual Property Inc.; Amy Scouten; Miriam Paton

(57) ABSTRACT

A receiver applies first processing to a digital representation of a received signal to generate a first processed signal having first additive noise and first linear inter-symbol interference (ISI), the first processing comprising a substantially linear operation designed to substantially minimize a sum of variances of the first additive noise and the first linear ISI. The receiver applies second processing to the first processed signal to generate a second processed signal having second additive noise and second linear ISI, the second processing comprising a substantially nonlinear operation designed (i) to make a variance of the second additive noise substantially lower than the variance of the first additive noise, and (ii) to make a sum of the variance of the second additive noise and a variance of the second linear ISI substantially lower than the sum of the variances of the first additive noise and first linear ISI.

20 Claims, 6 Drawing Sheets

(56) References Cited

OTHER PUBLICATIONS

Pajovic, et al., "Cross Polarization Modulation (XPoIM) Compensation for Submarine Upgrade Links using DP-8QAM", 42nd European Conference and Exhibition on Optical Communications, p. 1193-1195, Sep. 18, 2016.
Proakis, et al., "Digital Communications", Fifth Edition, McGraw-Hill Higher Education, 2008.
Van Trees, "Detection, Estimation, and Modulation Theory, Radar-Sonar Signal Processing and Gaussian Signals in Noise", John Wiley & Sons, 2001.

\* cited by examiner

600

602
DETECT A RECEIVED SIGNAL COMPRISING A DEGRADED VERSION OF A TRANSMITTED SIGNAL, THE RECEIVED SIGNAL SUFFERING FROM DEGRADATIONS INCURRED OVER A COMMUNICATION CHANNEL

604
APPLY FIRST PROCESSING TO A DIGITAL REPRESENTATION OF THE RECEIVED SIGNAL TO GENERATE A FIRST PROCESSED SIGNAL HAVING FIRST ADDITIVE NOISE AND FIRST LINEAR INTER-SYMBOL INTERFERENCE (ISI),
THE FIRST PROCESSING COMPRISING A SUBSTANTIALLY LINEAR OPERATION DESIGNED TO SUBSTANTIALLY MINIMIZE A SUM OF VARIANCES OF THE FIRST ADDITIVE NOISE AND THE FIRST LINEAR ISI

606
APPLY SECOND PROCESSING TO THE FIRST PROCESSED SIGNAL TO GENERATE A SECOND PROCESSED SIGNAL HAVING SECOND ADDITIVE NOISE AND SECOND LINEAR ISI, THE SECOND PROCESSING COMPRISING A SUBSTANTIALLY NONLINEAR OPERATION DESIGNED (I) TO MAKE A VARIANCE OF THE SECOND ADDITIVE NOISE SUBSTANTIALLY LOWER THAN THE VARIANCE OF THE FIRST ADDITIVE NOISE, AND (II) TO MAKE A SUM OF THE VARIANCE OF THE SECOND ADDITIVE NOISE AND A VARIANCE OF THE SECOND LINEAR ISI SUBSTANTIALLY LOWER THAN THE SUM OF THE VARIANCES OF THE FIRST ADDITIVE NOISE AND THE FIRST LINEAR ISI

FIGURE 6

NONLINEAR DIGITAL SIGNAL PROCESSING FOR ADDITIVE NOISE REMOVAL

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical signal, degradation or distortion may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), and other effects. The degree of signal degradation may be characterized by a signal-to-noise ratio (SNR), or alternatively by a noise-to-signal ratio (NSR).

The degradation and/or distortion observed in the received signal depends on the condition of the communication channel over which the signal is received. The condition of the communication channel may be characterized by the channel response, which may vary over time. By tracking time-varying changes in the channel response, it may be possible to compensate for those changes in the received signal, a process generally referred to as channel equalization.

SUMMARY

According to a broad aspect, a receiver device detects a received signal comprising a degraded version of a transmitted signal, the received signal suffering from degradations incurred over a communication channel. The receiver device applies first processing to a digital representation of the received signal to generate a first processed signal having first additive noise and first linear inter-symbol interference (ISI), the first processing comprising a substantially linear operation designed to substantially minimize a sum of variances of the first additive noise and the first linear ISI. The receiver device applies second processing to the first processed signal to generate a second processed signal having second additive noise and second linear ISI, the second processing comprising a substantially nonlinear operation designed (i) to make a variance of the second additive noise substantially lower than the variance of the first additive noise, and (ii) to make a sum of the variance of the second additive noise and a variance of the second linear ISI substantially lower than the sum of the variances of the first additive noise and first linear ISI.

According to some examples, the variances of the first linear ISI and the second linear ISI are substantially equal.

According to some examples, the substantially linear operation comprises linear filtering using a Wiener filter, a zero-forcing filter, a least mean squares (LMS) algorithm, a constant modulus algorithm (CMA), or a recursive least squares (RLS) algorithm.

According to some examples, the first additive noise is substantially correlated over two or more dimensions.

According to some examples, the substantially nonlinear operation comprises decoding a first estimate of the transmitted signal from the first processed signal and generating an estimate of the first additive noise using the first processed signal and the first estimate of the transmitted signal.

According to some examples, generating the estimate of the first additive noise comprises calculating a difference between the first processed signal and the estimate of the transmitted signal.

According to some examples, the second processing comprises generating the second processed signal using the first processed signal and the estimate of the first additive noise, and decoding a second estimate of the transmitted signal from the second processed signal.

According to some examples, the received signal is representative of data and forward error correction (FEC) redundancy dependent on the data, and the receiver device further applies FEC decoding to the second estimate of the transmitted signal to generate an estimate of the data.

According to some examples, a time delay incurred by applying the second processing to a single FEC block is lower than a time delay incurred by applying the FEC decoding to the FEC block.

According to some examples, the transmitted signal and the received signal are optical signals, and wherein the degradations incurred over the communication channel comprise polarization dependent loss.

BRIEF DESCRIPTION OF THE DRAWINGS

FIG. 6 illustrates an example method for digital signal processing in accordance with some examples of the technology disclosed herein.

DETAILED DESCRIPTION

Figure 1:
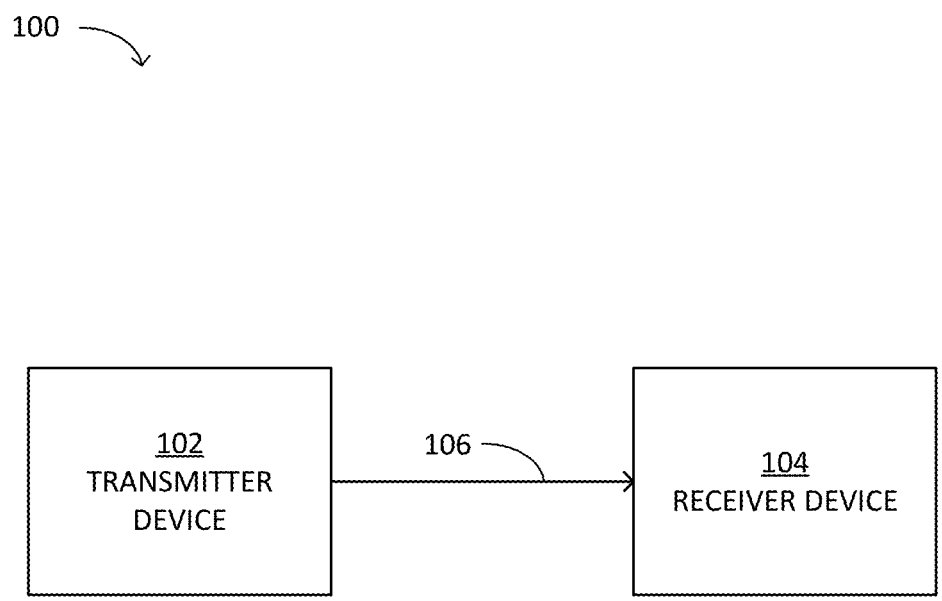
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. At the receiver device 104, the decoded symbols that are recovered may comprise noisy versions of the symbols that were originally transmitted by the transmitter device 102.

Figure 2:
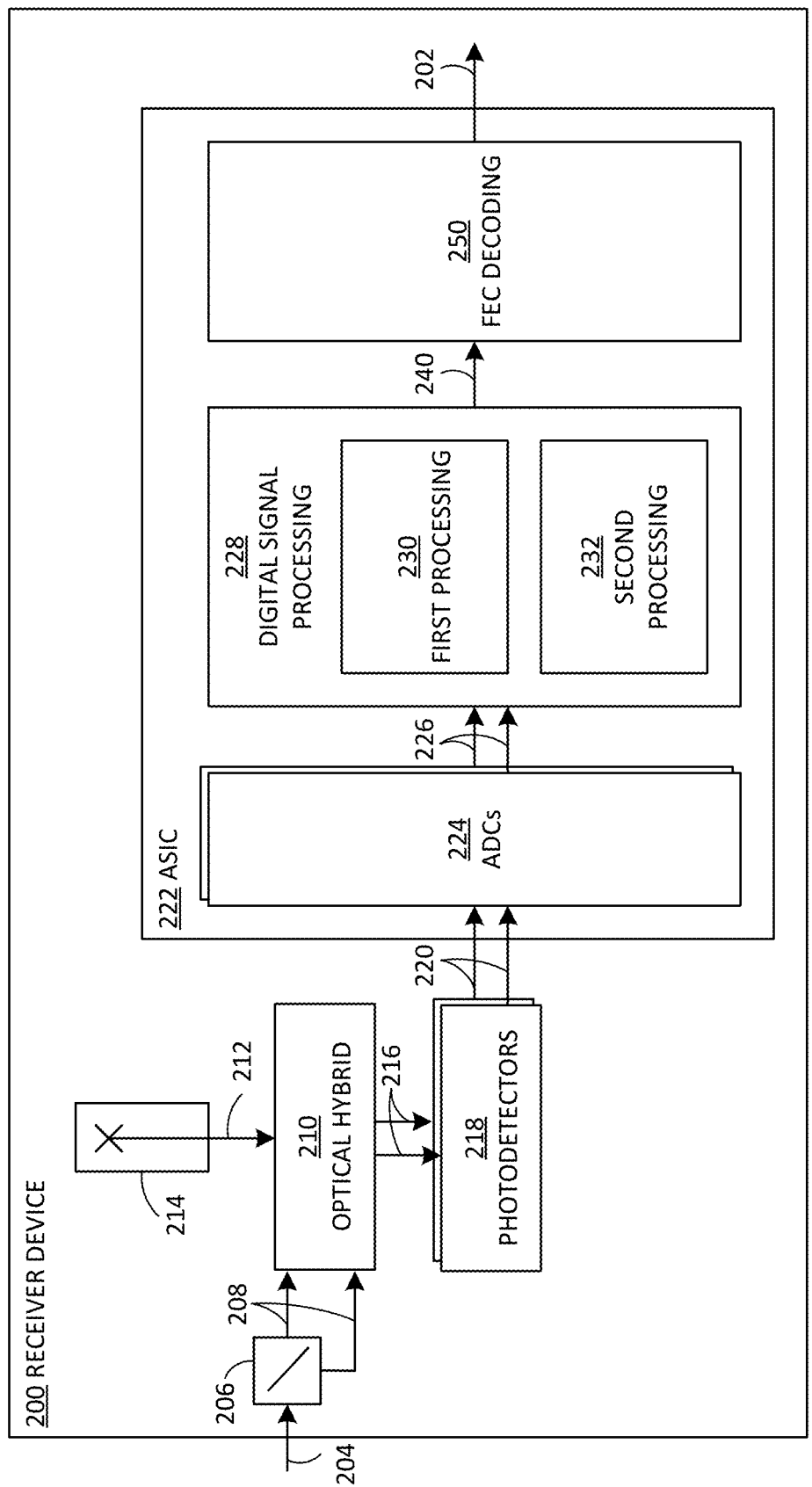
FIG. 2 illustrates an example receiver device in accordance with some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. The optical signal generated by the transmitter device may be representative of information bits (also referred to as client bits) which are to be communicated to the receiver device 200. The optical signal generated by the transmitter device may be representative of a stream of symbols comprising payload symbols and a known sequence of training symbols, where the training symbols are distributed over time and may be used for various operations within the receiver device 200, such as carrier recovery and compensation of channel impairments.

According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques such as polarization-division multiplexing (PDM), single polarization modulation, modulation of an unpolarized carrier, mode-division multiplexing, spatial-division multiplexing, Stokes-space modulation, polarization balanced modulation, and the like.

The receiver device 200 is configured to recover corrected client bits 202 from the received optical signal 204. The receiver device 200 may comprise a polarizing beam splitter 206 configured to split the received optical signal 204 into polarized components 208. According to one example, the polarized components 208 may comprise orthogonally polarized components corresponding to an X polarization and a Y polarization. An optical hybrid 210 is configured to process the components 208 with respect to an optical signal 212 produced by a laser 214, thereby resulting in optical signals 216. Photodetectors 218 are configured to convert the optical signals 216 output by the optical hybrid 210 to analog signals 220. According to one example, the analog signals 220 may comprise four signals corresponding, respectively, to the dimensions XI, XQ, YI, YQ, where XI and XQ denote the in-phase (I) and quadrature (Q) components of the X polarization, and YI and YQ denote the I and Q components of the Y polarization. Together, elements such as the beam splitter 206, the laser 214, the optical hybrid 210 and the photodetector 218 may form a communication interface configured to receive optical signals from other devices in a communication network, such as the network 100.

The receiver device 200 may comprise an application specific integrated circuit (ASIC) 222. The ASIC 222 may comprise analog-to-digital converters (ADCs) 224 which are configured to sample the analog signals 220, and to generate respective digital signals 226. Although illustrated as comprised in the ASIC 222, in an alternate implementation the ADCs 224 or portions thereof may be separate from the ASIC 222. The ADCs 224 sample the analog signals 220 periodically at a sample rate that is based on a signal received from a voltage-controlled oscillator (VCO) at the receiver device 200 (not shown).

The ASIC 222 is configured to apply digital signal processing 228 to the digital signals 226. For the purposes of the examples described herein, the digital signals 226 may be referred to as "received signals." According to some examples, the processing 228 may comprise transforming the digital signals 226 from the time domain to the frequency domain. For example, the overlap portion of an overlap and save (OAS) operation may be applied to the digital signals, and the resulting output signals may then undergo a fast Fourier transform (FFT) operation to generate discrete frequency-domain signals.

The digital signal processing 228 includes equalization processing designed to compensate for a variety of channel impairments, such as CD, SOP rotation, PMD including group delay (GD) and differential group delay (DGD), PDL or PDG, and other effects. The digital signal processing 228 further includes processing to decode symbol estimates and/or bit estimates from the received signals 226. As will be described further with respect to FIG. 3, the equalization may be implemented using first processing 230 and second processing 232. Where the received signals 226 have been transformed to the frequency domain for equalization and decoding, the digital signal processing 228 may further comprise high-frequency down-sampling, followed by an inverse Fourier transform (IFFT) to transform the resulting down-sampled signals to corresponding time-domain signals, followed by a discard operation which is the remaining portion of the OAS operation.

The digital signal processing 228 generates signals 240 that are representative of bit estimates. Where the received optical signal 204 is representative of symbols comprising FEC-encoded bits generated as a result of applying FEC encoding to client bits, the signals 240 may further undergo FEC decoding 250 to recover the corrected client bits 202.

Although not illustrated in FIG. 2, the digital signal processing 228 may include additional operations such as multiple-output (MIMO) filtering, carrier phase recovery, clock recovery, and FDM subcarrier de-multiplexing.

An example will now be considered to illustrate possible effects of equalization processing on the received signals 226. For the purposes of this example, dual polarization signals are considered, which may contain components in the X and Y polarizations, for example.

The channel impulse response (also called the transfer function) at time n may be expressed as a 2×2 matrix:

$$H(n) := \begin{bmatrix} H_{XX}(n) & H_{XY}(n) \\ H_{YX}(n) & H_{YY}(n) \end{bmatrix} \quad (1)$$

where $H_{XX}$, $H_{XY}$, $H_{YX}$, $H_{YY}$ denote the components of the channel impulse response H reflecting the channel effects over the X and Y polarizations. Channel effects reflected by the channel impulse response H may include, for example, PDL, PMD, CD, and polarization rotation.

The channel noise signals at time n may be expressed as:

$$z(n) := \begin{bmatrix} z_X(n) \\ z_Y(n) \end{bmatrix} \quad (2)$$

where $z_X$ and $z_Y$ denote the components of the channel noise signals z in the X and Y polarizations, respectively. For the purposes of this example, the channel noise signals z are assumed to be uncorrelated Additive White Gaussian Noise (AWGN). However, in general, the channel noise can be correlated in time due to PDL elements in the fiber.

The received signals (e.g., the digital signals 226) at time n may be expressed as:

$$r(n) := \begin{bmatrix} r_X(n) \\ r_Y(n) \end{bmatrix} \quad (3)$$

where $r_X$ and $r_Y$ denote the components of the received signals r in the X and Y polarizations, respectively.

The transmitted signals (e.g., the signals transmitted by the transmitter device 102 over the communication channel 106) at time n may be expressed as:

$$s(n) := \begin{bmatrix} s_X(n) \\ s_Y(n) \end{bmatrix} \quad (4)$$

where $s_X$ and $s_Y$ denote the components of the transmitted signals s in the X and Y polarizations, respectively.

Because the channel noise signals z are assumed to be AWGN, the received signals r may be modeled in the time domain as:

$$r(n) = z(n) + \sum_{k=-\Delta}^{\Delta} H(k)s(n-k) \quad (5)$$

That is, the received signals r are equal to a sum of the channel noise signals z and the time-domain convolution of the transmitted signals s with the channel impulse response H, where the interval k=−Δ . . . +Δ covers the domain of the channel impulse response H.

In general, the digital signal processing performed at the receiver device includes signal equalization processing to reduce the channel noise signals z from the received signals r and to compensate for the effects of the channel impulse response H on the transmitted signals s.

According to some examples, the effects of the channel impulse response functions H on the transmitted signals s may be at least partially removed by applying a linear filter to the received signals r, thereby resulting in first processed signals r'. The linear filter may comprise a set of 2×2 matrices denoted G(k), for k=−L . . . L, where L is a positive integer:

$$G(k) := \begin{bmatrix} G_{XX}(k) & G_{XY}(k) \\ G_{YX}(k) & G_{YY}(k) \end{bmatrix} \quad (6)$$

where $G_{XX}(k)$, $G_{XY}(k)$, $G_{YX}(k)$, $G_{YY}(k)$ may be referred to as the coefficients of the matrix G at time k.

In the time domain, the first processed signals, herein denoted by r', may be expressed as:

$$r'(n) = \sum_{k=-L}^{L} G(k)r(n-k) \quad (7)$$

That is, the first processed signals r' are equal to the time-domain convolution of the received signals r with the filter reflected by matrices G. The first processed signals r' comprise components $r_X'$ and $r_Y'$ in the X and Y polarizations, respectively.

The effect of the filter on the received signals r depends on the nature of the impulse response H, the nature of the channel noise signals z, and the type of filter that is used. For the purposes of the examples presented in this document, nonlinear operations such as carrier phase and frequency recovery and clock recovery are ignored. Furthermore, it is assumed that, during the relatively short time intervals being considered in the examples presented herein, the channel conditions are not changing significantly, such that H and G may be considered static for simplicity. The nonlinear effects of quantization and clipping are also assumed to be negligible for the purposes of the examples presented herein.

In the event that the channel noise consists of AWGN and in the absence of any distortion (i.e., the impulse response H is an identity matrix), filtering using a Nyquist-pulse shape, such as a raised cosine filter, is expected to eliminate inter-symbol interference (ISI) while also minimizing the channel noise. It is common practice to split a Nyquist filter between the transmitter and the receiver, also known as matched filtering. For example, a root-raised cosine filter may be applied at the transmitter, and another root-raised cosine filter (a matched filter) may be applied at the receiver.

In the event that the channel noise consists of AWGN and there is unitary distortion present (i.e., the impulse response H is unitary), the ISI may be eliminated by concatenating a zero-forcing filter (i.e., $G=H^{-1}$) with the matched filter. The channel noise, minimized by the matched filter, is unaffected by the zero-forcing filter.

In the event that the channel noise includes non-AWGN and/or there is non-unitary distortion present (i.e., the impulse response H is non-unitary), a zero-forcing filter may be used to eliminate ISI, but may actually increase the channel noise. Under these circumstances, it may be advantageous to use a Wiener filter instead of a zero-forcing filter. A Wiener filter balances noise effects against ISI effects by acting to minimize a sum of the noise variance and the ISI variance. Under certain conditions, a Wiener filter may be approximated by various algorithms, such as a least mean squares (LMS) algorithm as described for example by Roberts and Sun in U.S. Pat. No. 8,385,747, or a constant modulus algorithm (CMA), or a recursive least squares (RLS) algorithm.

Where the linear filter represented by the matrices G is generated according to a minimum mean squared error algorithm, such as a LMS algorithm, the coefficients of the matrices G may be calculated to satisfy the following expression:

$$\min_{G(-L),\ldots,G(L)} |r'(n) - s(n)|^2 = \min_{G(-L),\ldots,G(L)} \left| \sum_{k=-L}^{L} G(k) r(n-k) - s(n) \right|^2 \quad (8)$$

Under high SNR conditions, the matrices G that satisfy the above expression are approximately equal to the inverse of the channel response H. In other words, the matrices G are substantially equivalent to a zero-forcing filter, and the convolution of G and H is substantially equal to the identity matrix. Under these circumstances, Equations 5 and 7 may be combined to yield the following representation of the first processed signals r':

$$r'(n) \approx s(n) + \sum_{k=-\Delta}^{\Delta} G(k) z(n-k) \quad (9)$$

In other words, the first processed signals r' may be approximated as the sum of the transmitted signals s, and the time-domain convolution of the matrices G with the channel noise signals z. The convolution term in Equation 9 represents the additive noise and linear ISI present in the first processed signals r'. The convolution term is herein denoted by complex vectors w, which are expressed in the time domain as:

$$w(n) := \begin{bmatrix} w_X(n) \\ w_Y(n) \end{bmatrix} = \sum_{k=-\Delta}^{\Delta} G(k) z(n-k) \quad (10)$$

where $w_X$ and $w_Y$ denote the components of the channel noise signals w in the X and Y polarizations, respectively.

If the channel impulse response H(k), $k=-\Delta \ldots +\Delta$, comprises unitary matrices, it follows that the matrices G(k), $k=-\Delta \ldots +\Delta$, are also unitary matrices. Under these circumstances, Equation 10 dictates that the w terms would be independent. However, due to channel effects such as PDL, the matrices H are generally not unitary, so it follows that the matrices G will also be non-unitary. Under these circumstances, Equation 10 dictates that the w terms are inter-dependent. In other words, filtering the received signals using the matrices G can have an effect of generating correlation in the noise signals w.

According to some examples, the noise signals w may be correlated over different polarizations as expressed in Equation 11:

$$E\{w_X(n) w_Y(n)^*\} \neq 0 \quad (11)$$

where E{ } denotes an expectation value, and where $w_Y(n)^*$ denotes the complex conjugate of $w_Y(n)$. That is, the noise signals w are correlated between polarizations X and Y when the expectation value of the product of the X component of w and the complex conjugate of the Y component of w is not equal to zero.

According to some examples, the noise signals w may alternatively or additionally be correlated over time, as expressed in Equation 12:

$$\forall n \neq m : E\{w(n) w(m)^\dagger\} \neq \begin{bmatrix} 0 & 0 \\ 0 & 0 \end{bmatrix} \quad (12)$$

where $w(m)^\dagger$ denotes the Hermitian of w(m). That is, the noise signals w are correlated over time when the expectation value of the product of w at time n and the Hermitian of w at time m is not a null matrix, for each value of n that is not equal to m.

Under some circumstances, for example, if noise is only correlated in a single dimension, the noise correlation may be accounted for by using an anisotropic detector. However, this type of detection may be complex to implement at high speed.

Noise correlation is often addressed by noise whitening, which is typically achieved with a linear filter. For example, U.S. Pat. No. 8,718,491 to Khandani et al. describes methods for compensating noise due to PDL. A LMS compensation block processes sample streams of the received optical signal to generate symbol estimates, and a decorrelation block decorrelates noise in the respective symbol estimates and generates a set of decorrelated coordinate signals. The decorrelation block achieves noise decorrelation using a linear matrix as a whitening filter. Whitening filters generally make detection easier but increase ISI variance.

Decision Feedback Equalization (DFE), as described, for example, by Proakis and Salehi in "Digital Communications", *McGraw-Hill Higher Education,* 2008, involves using previous symbol decisions to glean information about channel interference, and then using that information to improve current decoding decisions. Standard DFE methods do not effectively handle multidimensional signals, such as coherently detected optical signals. Standard DFE methods also do not address non-causal ISI. Furthermore, in the presence of substantial noise (e.g., noise sufficient to necessitate the use of strong FEC), DFE may increase noise rather than decrease it, since previous symbol decisions are more likely to be erroneous.

In U.S. Pat. No. 9,088,387, Oveis Gharan and Roberts describe chain decoding methods which use feedback from previous FEC decoding results to enhance subsequent decoding. Because the feedback has undergone FEC decoding, it is more reliable than the feedback used in standard DFE. However, this improvement comes at the expense of greater complexity and time delays.

In U.S. Pat. No. 10,211,919, Oveis Gharan and Roberts describe methods for mitigating narrow-band impairments imposed by an analog channel on a data signal within a bounded spectral region. A first adaptation function is applied upstream of the analog channel to relocate vulnerable frequency components of the signal away from the bounded spectral region that is predicted to be affected by the spectrally bounded impairments of the analog channel. A second adaption function is applied downstream of the analog channel to return the relocated frequency components of the signal back to their original locations within the signal spectrum.

In "Nonlinear Polarization Crosstalk Canceller for Dual-Polarization Digital Coherent Receivers", *Optical Fiber Communications Conference,* 2010, Li et al. describe a method for cancelling polarization crosstalk induced by channel nonlinearities. By applying a linear operation to the received signals, the nonlinear polarization crosstalk is shown to be reduced under low noise conditions. However, in the presence of typical noise levels, the method proposed by Li et al. actually increases noise.

In "Cross Polarization Modulation (XpolM) Compensation for Submarine Upgrade Links using DP-8QAM)", *European Conference and Exhibition on Optical Communications,* 2016, Pajovic et al. describe another method for compensating for cross-polarization modulation caused by channel nonlinearities. This method again involves applying a linear operation to the received signals.

Various techniques have been proposed to compensate for sources of multiplicative noise, such as jitter, carrier phase noise, and cross-phase modulation.

Technology is herein proposed for removing additive noise from signals received at a receiver device over a communication channel. The proposed technology takes noise correlations, which may be generated during a first stage of digital signal processing at the receiver device, and exploits those correlations to remove additive noise during a second stage of digital signal processing at the receiver device. Notably, in contrast to the linear operations described by Li et al. and Pajovic et al., the second stage of processing achieves the additive noise removal by applying at least one substantially nonlinear operation to the signal being processed. In contrast to standard whitening filters, the proposed technology may be capable of reducing additive noise without a significant increase in linear ISI. Unlike standard DFE methods, the proposed technology is capable of handling multidimensional signals with substantial noise (e.g., noise necessitating the use of FEC coding). It is also capable of exploiting causal as well as noncausal correlations in time. Furthermore, the noise removal methods described herein do not rely on feedback from FEC decoding, and therefore do not have the time delays and complexities associated with the chain decoding methods described in U.S. Pat. No. 9,088,387.

For the purposes of this document, the first and second stages of digital signal processing used to implement the proposed technology are delineated by the first processing 230 and the second processing 232, respectively, as illustrated in FIGS. 2-5. However, it should be understood that the first processing 230 and the second processing 232 are merely example implementations of the proposed technology. According to some examples, the first processing 230 comprises generating one or more first output signals that are a substantially linear function of one or more first input signals. However, in some examples, certain aspects of the first processing 230 may comprise nonlinear operations. According to some examples, the second processing 232 comprises generating one or more second output signals that are a substantially nonlinear function of one or more second input signals. However, in some examples, certain aspects of the second processing 232 may comprise linear operations. As will be explained further with reference to FIGS. 3, 4, and 5, the second processing 232 generally comprises generating the one or more second output signals as a substantially nonlinear function of the one or more first output signals generated by the first processing 230. Notably, the substantially nonlinear operation(s) implemented as part of the second processing 232 are not dependent on signals that have undergone any FEC decoding. Consequently, the noise removal afforded by the second processing 232 may be done with significantly less latency and less hardware than methods, such as chain decoding, that are limited by the delay of the FEC processing.

Figure 3:
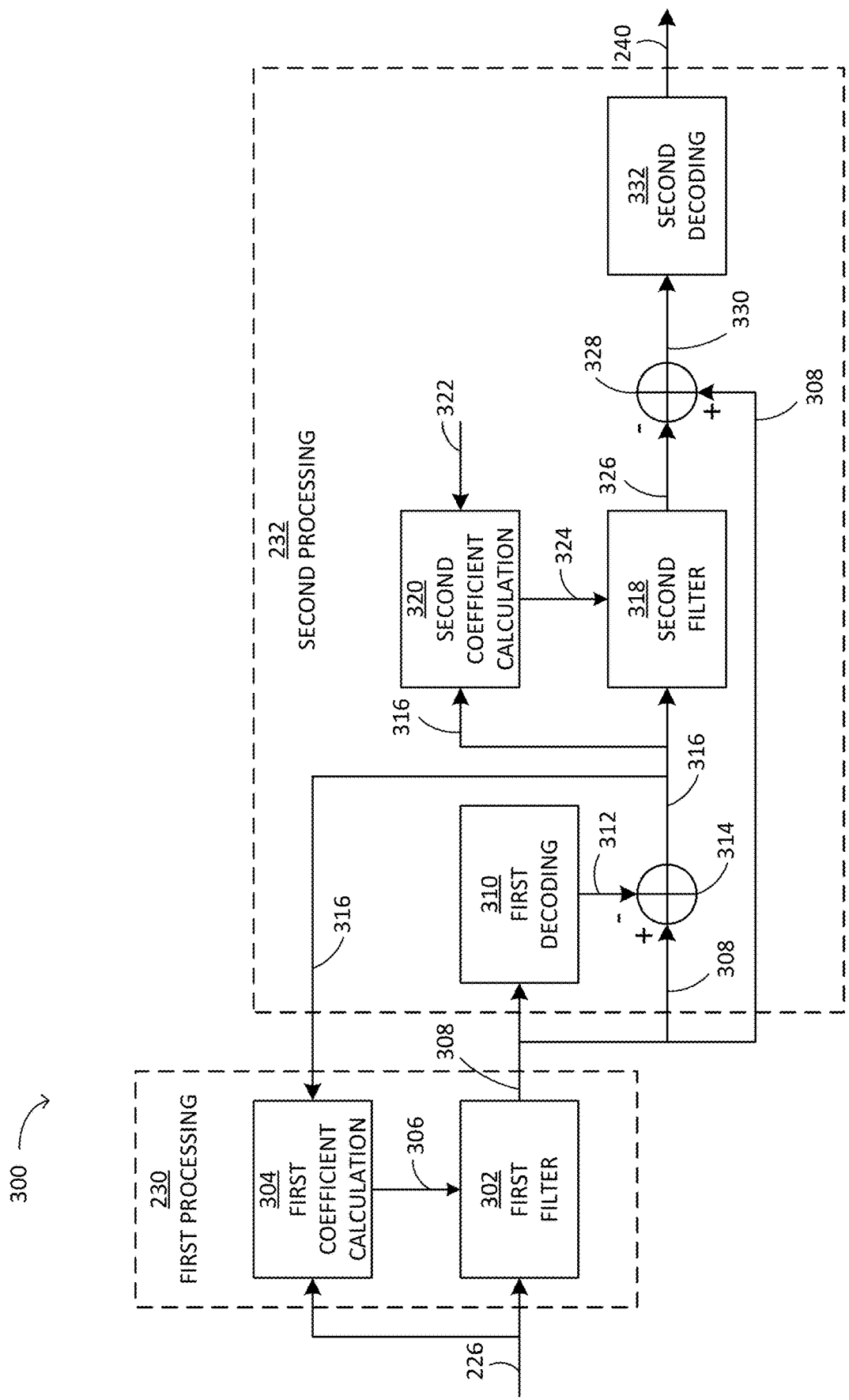
FIG. 3 illustrates a schematic representing a first example of the digital signal processing implemented by the receiver device in FIG. 2.

FIG. 3 illustrates a schematic 300 representing a first example of the digital signal processing 228 shown in FIG. 2.

In this example, the first processing 230 comprises applying a first filter 302 to the received signals 226 that are output by the ADCs 224. According to some examples, the first filter 302 is a substantially linear filter configured to convolve the received signals 226 in the time domain with 2L+1 2×2 matrices comprising first coefficients 306, where L is a positive integer which may be selected to balance trade-offs between hardware size and function. Alternatively, where the received signals 226 have been transformed to the frequency domain, the first filter 302 may be implemented by matrix multiplication between the frequency-domain signals and the frequency-domain version of the matrices comprising the first coefficients 306. According to some examples, the first coefficients 306 may be calculated using a first coefficient calculation 304 which takes into account feedback downstream from the first processing 230 (e.g., signals generated by the second processing 232).

The first filter 302 generates first processed signals 308 as a substantially linear function of the received signals 226. For example, where the received signals 226 are represented by r and where the first filter 302 is represented by the matrices G, the first processed signals 308 may be represented by r' as expressed in Equation 7.

According to some examples, the first processed signals 308 may undergo first decoding 310, thereby resulting in first transmitted signal estimates 312. The first transmitted signal estimates 312, herein denoted by s', may comprise components $s_X'$ and $s_Y'$ in the X and Y polarizations, respectively. Various types of decoding may be used to implement the first decoding 310. According to one example, where the first decoding 310 comprises two-dimensional decoding, a decoding operator D may be applied separately to the first processed signal components $r_X'$ and $r_Y'$ as shown in Equations 13:

$$s_X'(n) = D(r_X'(n))$$

$$s_Y'(n) = D(r_Y'(n)) \quad (13)$$

Whether the decoding is two-dimensional, four-dimensional, or otherwise, the decoding operator D generally applies a substantially nonlinear operation to the first processing signal r'. In other words, the first transmitted signal estimates 312 are calculated as a substantially nonlinear function of the first processed signals 308.

In a standard receiver device, the first transmitted signal estimates 312 may be used to recover bit estimates, which may then undergo FEC decoding to recover the corrected client bits. Referring to an example in which the first filter 302 acts substantially as a zero-forcing filter, the first processed signals r' are substantially equal to a sum of the original transmitted signals s and the noise signals w as expressed in Equation 10. In the general case where the first filter 302 applies matrices G that are not unitary (e.g., when the first filter 302 is compensating for PDL in the received signals 226), then the contribution of the additive noise signals z to the received signals r is expected to result in noise signals w that are correlated in time and/or polarization. When present, these correlations may be exploited to achieve additional removal of noise and/or linear ISI from the received signals 226.

According to some examples, a difference operation 314 may be applied to the first transmitted signal estimates 312 and to the first processed signals 308 to generate difference signals 316. The difference signals 316 may be used by the first coefficient calculation 304. For example, first coefficient calculation 304 may calculate the first coefficients 306 in such a manner as to minimize error, for example, as described with respect to Equation 8, where the error may be estimated from the difference signals 316. However, in general, first coefficient calculation 304 may use other methods such as CMA in order to calculate the coefficients for block 302.

Referring to Equations 9 and 10, the first processed signals r' are modelled as a sum of the transmitted signals s and the noise signals w. In this example, the difference signals 316 are used to obtain estimates of the noise signals w, herein referred to as first noise estimates w'. Since the first transmitted signal estimates 312 are estimates of the transmitted signals s, it follows that first noise estimates w' may be calculated as:

$$w'(n) = r'(n) - s'(n) \quad (14)$$

The first noise estimates which comprise components $w_X'$ and $w_Y'$ in the X and Y polarizations, respectively, are inherently a substantially nonlinear function of the first processed signals r' because the difference operation 314 is a function of the first transmitted signal estimates s', which are generated by the (substantially nonlinear) first decoding 310.

In the example schematic 300, the second processing 232 comprises applying a second filter 318 to the difference signals 316 that are output by the difference operation 314. According to some examples, the second filter 318 is a substantially linear filter comprising a set of 2×2 matrices denoted T(k) as expressed in Equation 15, for k=−M . . . M, where M is a positive integer. The value of M may or may not be the same as the value of L used for the first filter 302, and may be selected to balance trade-offs between hardware size and function.

$$T(k) := \begin{bmatrix} T_{XX}(k) & T_{XY}(k) \\ T_{YX}(k) & T_{YY}(k) \end{bmatrix} \quad (15)$$

where $T_{XX}(k)$, $T_{XY}(k)$, $T_{YX}(k)$, $T_{YY}(k)$ may be referred to as the coefficients of the matrix T at time k, and are referred to as second coefficients 324 in FIG. 3. According to some examples, the second coefficients 324 may be calculated using a second coefficient calculation 320 which takes into account the difference signals 316 and training information 322. The training information 322 may comprise, for example, the result of processing known symbols at known locations within the received signals r(n) to determine expected noise correlations.

The second filter 318 generates signals 326 as a substantially linear function of the difference signals 316. Where the difference signals 316 are referred to as the first noise estimates w', the signals 326 may be referred to as second noise estimates w''. In the time domain, the second noise estimates w'' may be expressed as:

$$w''(n) = \sum_{k=-M}^{M} T(k)w'(n-k) \quad (16)$$

That is, the second noise estimates w'' are equal to the time-domain convolution of the first noise estimates w' with the second filter reflected by matrices T. The second noise estimates w'' comprise components $w_X''$ and $w_Y''$ in the X and Y polarizations, respectively.

Where the substantially linear filter represented by the matrices T is generated according to a minimum mean squared error algorithm, such as a LMS algorithm, the coefficients of the matrices T may be calculated to satisfy the following expression:

$$\min_{T(-M),\ldots,T(M)} |w''(n) - w(n)|^2 = \quad (17)$$

$$\min_{T(-M),\ldots,T(M)} \left| \sum_{k=-M}^{M} T(k)w'(n-k) - w(n) \right|^2$$

It is noted that the diagonal terms of T(0) may be set to zero so as to avoid introducing positive feedback into the processing. That is, $T_{XX}(0) = T_{YY}(0) = 0$.

According to some examples, a difference operation 328 may be applied to the signals 326 and 308 to generate second processed signals 330 equal to the difference between the signals 326 and 308. Thus, where the second processed signals 330 are denoted by r'', they may be obtained by subtracting the second noise estimates w'' from the first processed signals r' as expressed in Equation 18:

$$r''(n) = r'(n) - w''(n) \quad (18)$$

The second processed signals r'', which comprise components $r_X''$ and $r_Y''$ in the X and Y polarizations, respectively, are inherently a substantially nonlinear function of the first processed signals r' because the difference operation 328 is a function of the second noise estimates w", which in turn are a function of the first transmitted signal estimates s' generated by the (high-speed and substantially nonlinear) first decoding 310.

The signals 326 (i.e., the second noise estimates w") may be used as approximations of the noise signals w which contribute to the first processed signals r' 308, as expressed in Equations 9 and 10. By taking these approximations of w into account, the variance of the noise contained in the second processed signals r" 330 is expected to be lower than the variance of the noise contained in the first processed signals r' 308. Notably, however, the variance of the linear ISI contained in the second processed signals r" 330 is not expected to be significantly greater than the variance of the linear ISI contained in the first processed signals r' 308. For example, the first processing 230 may generate first processed signals r' 308 having a first noise variance Vn1 and a first linear ISI variance Visi1, while the second processing 232 may generate second processed signals r" 330 having a second noise variance Vn2 and a second linear ISI variance Visi2. According to some examples, the second processing 232 may achieve the effect that the second noise variance is significantly lower than the first noise variance, that is Vn2<<Vn1. According to some examples, the second processing 232 may further achieve the effect that the sum of the second noise variance and the second linear ISI variance is significantly lower than the sum of the first noise variance and the first linear ISI variance, that is Vn2+Visi2<<Vn1+Visi1. According to some examples, the second processing 232 may achieve the effect that the second linear ISI variance is approximately equal to or lower than the first linear ISI variance, that is Visi2≤Visi1.

According to some examples, the second processed signals 330 may undergo second decoding 332, thereby resulting in the signals 240. In this example, the signals 240 are referred to as second transmitted signal estimates s" and comprise components $s_X''$ and $s_Y''$ in the X and Y polarizations, respectively. Various types of decoding may be used to implement the second decoding 332. According to one example, where the second decoding 332 comprises two-dimensional decoding, a decoding operator D may be applied separately to the second processed signal components $r_X''$ and $r_Y''$ as shown in Equations 19:

$$s_X''(n)=D(r_X''(n))$$

$$s_Y''(n)=D(r_Y''(n)) \quad (19)$$

where the decoding operator D may be the same as or different from the one used to implement the first decoding 310.

Because the second processed signals r" 330 are expected to have reduced noise variance relative to the first processed signals r' 308, it is expected that the second transmitted signal estimates s" 240 will provide better approximations of the transmitted signals s than the first transmitted signal estimates s' 312. More accurate estimates of the transmitted signals s may in turn allow for improved performance and faster transmission speeds.

Figure 4:
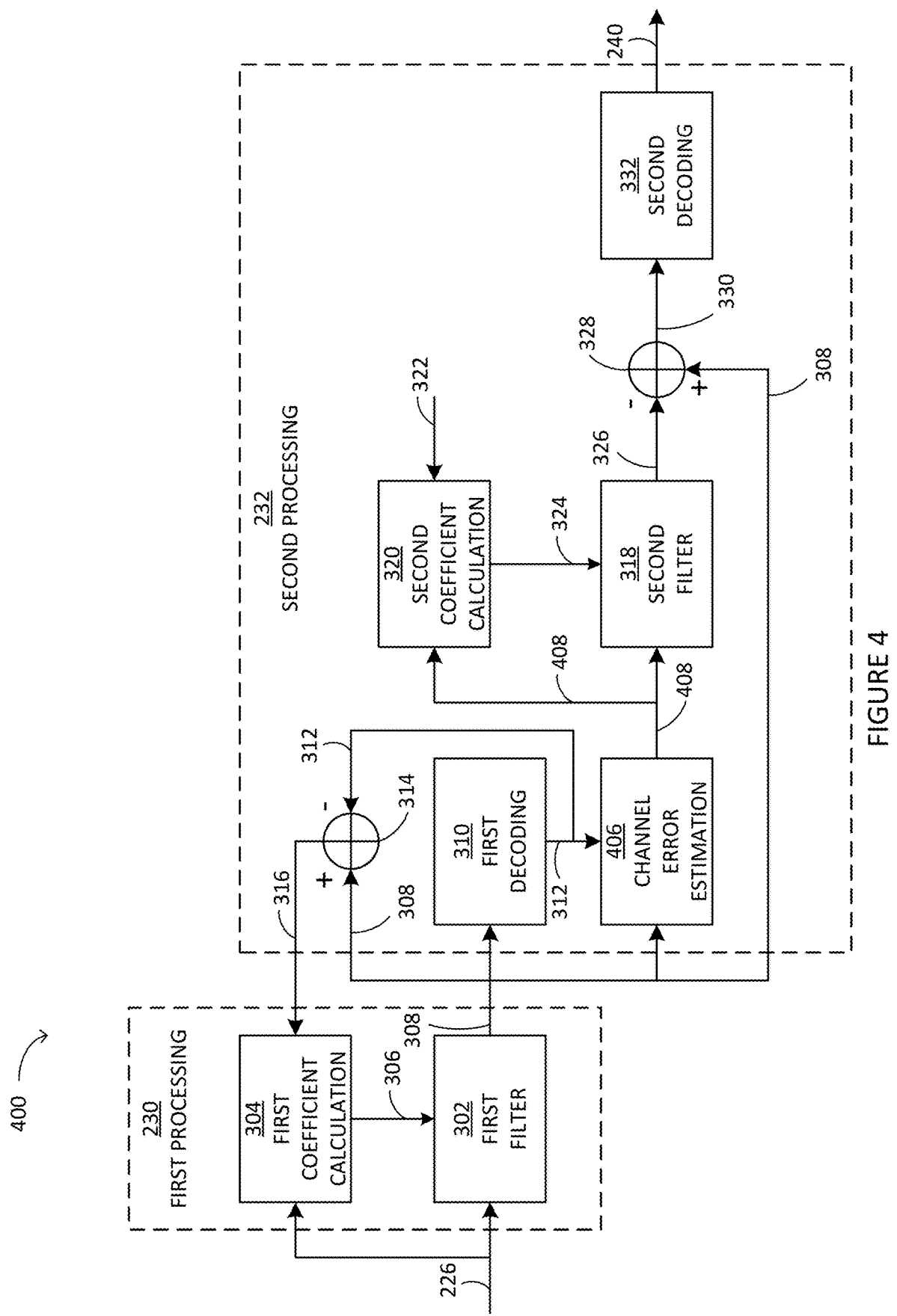
FIG. 4 illustrates a schematic representing a second example of the digital signal processing implemented by the receiver device in FIG. 2.

FIG. 4 illustrates a schematic 400 representing a second example of the digital signal processing 228 shown in FIG. 2.

Similarly to the first processing 230 in the schematic 300, the first processing 230 in the schematic 400 may apply the first filter 302 to the received signals 226, either by convolution in the time domain or multiplication in the frequency domain. The first coefficients 306 used by the first filter 302 may be calculated by the first coefficient calculation 304, which takes into account feedback downstream from the first processing 230. The first processed signals 308 generated by the first filter 302 are a substantially linear function of the received signals 226.

As described with respect to the schematic 300, the first decoding 310 is applied to the first processed signals 308, thereby resulting in first transmitted signal estimates 312. The difference operation 314 is applied to the first transmitted signal estimates 312 and to the first processed signals 308 to generate the difference signals 316. The difference signals 316 may be used by the first coefficient calculation 304.

According to the example in the schematic 300, the first noise estimates w' are obtained from the difference signals 316. However, other methods may be used to obtain the first noise estimates w'. According to the example in the schematic 400, a channel error estimation operation 406 may be applied to the first transmitted signal estimates s' 312 and to the first processed signals r' 308. The channel error estimation operation 406 may comprise, for example, operations that are more intricate than simply calculating the difference r'(n)−s'(n). These operations may be anisotropic, non-stationary, or nonlinear. According to some examples, knowledge of the coefficients of the matrices G may be used by the channel error estimation operation 406. The channel error estimation operation 406 may be nonlinear in its most general form, and may be achieved, for example, through a look-up table (LUT). The LUT entries in the most general form may be programmed in order to provide the best estimate of the true channel noise value w, such as by minimizing the variance of error between the channel noise estimate w' and the true channel noise value w.

In this example, signals 408 generated by the channel error estimation operation 406 may be used as the first noise estimates w'. As illustrated in the schematic 400, the second processing 232 comprises applying the second filter 318 to the signals 408, either by convolution in the time domain or multiplication in the frequency domain. The second coefficients 324 used by the second filter 318 may be calculated using the second coefficient calculation 320, which takes into account the signals 408 and the training information 322.

In this example, the second filter 318 generates the signals 326 as a substantially linear function of the signals 408, rather than the difference signals 316. As described with respect to the schematic 300, the difference operation 328 may be applied to the signals 326 and 308 to generate the second processed signals 330. The signals 326 (i.e., the second noise estimates w") may be used as approximations of the noise signals w. By accounting for these approximations of w, the variance of the noise contained in the second processed signals r" 330 is expected to be lower than the variance of the noise contained in the first processed signals r' 308, as described with respect to the schematic 300. The second processed signals 330 may undergo the second decoding 332, as described previously, thereby resulting in the signals 240 (i.e., the second transmitted signal estimates s").

Figure 5:
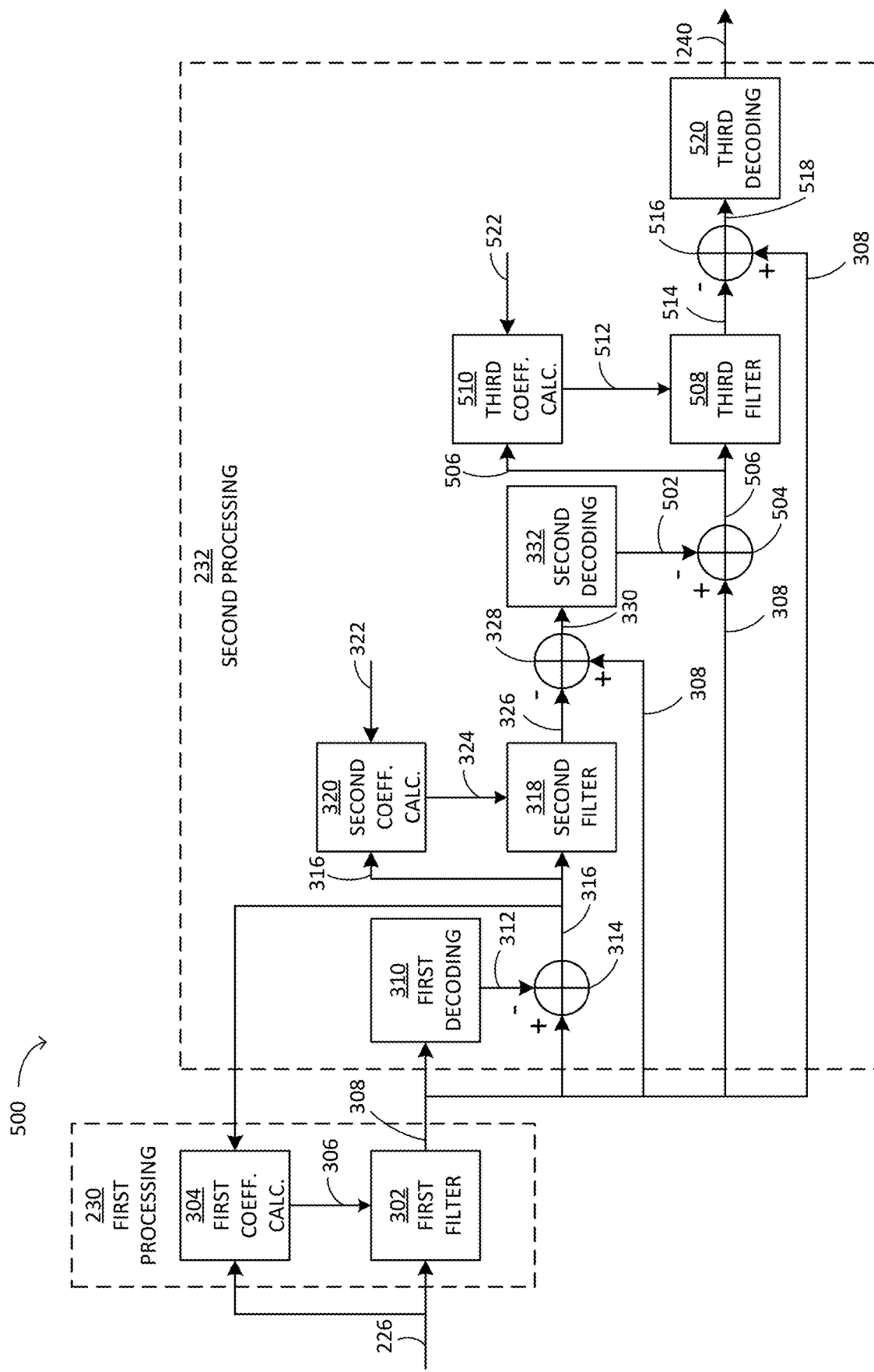
FIG. 5 illustrates a schematic representing a third example of the digital signal processing implemented by the receiver device in FIG. 2.

FIG. 5 illustrates a schematic 500 representing a third example of the digital signal processing 228 shown in FIG. 2.

Similarly to the first processing 230 in the schematics 300 and 400, the first processing 230 in the schematic 500 may apply the first filter 302 to the received signals 226, either by convolution in the time domain or multiplication in the frequency domain. The first coefficients 306 used by the first filter 302 may be calculated by the first coefficient calculation 304, which takes into account feedback downstream from the first processing 230. The first processed signals 308 generated by the first filter 302 are a substantially linear function of the received signals 226.

As described with respect to the schematics 300 and 400, the first decoding 310 is applied to the first processed signals 308, thereby resulting in first transmitted signal estimates 312. The difference operation 314 is applied to the first transmitted signal estimates 312 and to the first processed signals 308 to generate the difference signals 316, which may be used by the first coefficient calculation 304.

As described with respect to the schematic 300, the first noise estimates w' are obtained from the difference signals 316. The second filter 318 generates the signals 326 as a substantially linear function of the difference signals 316. The signals 326 (i.e., the second noise estimates w'') are expected to provide better approximations of the noise signals w than the difference signals 316 (i.e., the first noise estimates w'). As described with respect to the schematics 300 and 400, the difference operation 328 may be applied to the signals 326 and 308 to generate the second processed signals r'' 330. The second processed signals r'' 330 may undergo the second decoding 332 as described previously, thereby resulting in signals 502.

The signals 502 correspond to the second transmitted signal estimates s'' described previously. In the event that the signals 502 still include some amount of correlated noise, it may be advantageous to obtain one or more additional noise estimates and to calculate one or more additional transmitted signal estimates based on the additional noise estimates. That is, instead of applying the FEC decoding directly to the second transmitted signal estimates s'', the second processing 232 may include additional processing steps designed to further reduce the noise variance in the signals 240 to which the FEC decoding is applied. For example, as illustrated in the schematic 500, a further difference operation 504 may be applied to the signals 502 (i.e., the second transmitted signal estimates s'') and to the first processed signals 308 to generate difference signals 506. In this example, the difference signals 506 are used to obtain estimates of the noise signals w, herein referred to as third noise estimates w''', according to:

$$w'''(n) = r'(n) - s''(n) \quad (20)$$

The third noise estimates w''', which comprise components $w_X'''$ and $w_Y'''$ in the X and Y polarizations, respectively, are inherently a substantially nonlinear function of the first processed signals r' 308. The nonlinearity is a result of the first decoding 310, the difference operation 314, the second decoding 332, and the difference operation 504.

In the example schematic 500, the second processing 232 comprises applying a third filter 508 to the difference signals 506 that are output by the difference operation 504. According to some examples, the third filter 508 is a substantially linear filter comprising a set of 2×2 matrices denoted V(k) as expressed in Equation 21, for k=−N . . . N, where N is a positive integer. The value of N may be selected in consideration of trade-offs between hardware size and function. According to some examples, N=L+M, where L refers to the value used for the first filter 302, and M refers to the value used for the second filter 318.

$$V(k) := \begin{bmatrix} V_{XX}(k) & V_{XY}(k) \\ V_{YX}(k) & V_{YY}(k) \end{bmatrix} \quad (21)$$

where $V_{XX}(k)$, $V_{XY}(k)$, $V_{YX}(k)$, $V_{YY}(k)$ may be referred to as the coefficients of the matrix V at time k, and are referred to as third coefficients 512 in FIG. 5. According to some examples, the third coefficients 512 may be calculated using a third coefficient calculation 510 which takes into account the difference signals 506 and training information 522. The training information 522 may comprise, for example, the result of processing known symbols at known locations within the received signals r(n) to determine expected noise correlations. The training information 522 may or may not be the same as the training information 322 used by the second coefficient calculation 320.

The third filter 508 generates signals 514 as a substantially linear function of the difference signals 506. Where the difference signals 506 are referred to as the third noise estimates w''', the signals 514 may be referred to as fourth noise estimates w''''. The terms of the matrices V may be referred to as coefficients. In the time domain, the fourth noise estimates w'''' may be expressed as:

$$w''''(n) = \sum_{k=-N}^{N} V(k)w'''(n-k) \quad (22)$$

That is, the fourth noise estimates w'''' are equal to the time-domain convolution of the third noise estimates w''' with the third filter reflected by matrices V. The fourth noise estimates w'''' comprise components $w_X''''$ and $w_Y''''$ in the X and Y polarizations, respectively.

Where the substantially linear filter represented by the matrices V is generated according to a minimum mean squared error algorithm, such as a LMS algorithm, the coefficients of the matrices V may be calculated to satisfy the following expression:

$$\min_{T(-N),\ldots,T(N)} |w''''(n) - w(n)|^2 = \quad (23)$$

$$\min_{T(-N),\ldots,T(N)} \left| \sum_{k=-N}^{N} V(k)w'''(n-k) - w(n) \right|^2$$

It is noted that the diagonal terms of V(k) may be set to zero so as to avoid introducing positive feedback into the processing. That is, $V_{XX}(k) = V_{YY}(k) = 0$ for each value k.

According to some examples, a difference operation 516 may be applied to the signals 514 and 308 to generate third processed signals 518 equal to the difference between the signals 514 and 308. Thus, where the third processed signals 518 are denoted by r''', they may be obtained by subtracting the fourth noise estimates w'''' from the first processed signals r' as expressed in Equation 24:

$$r'''(n) = r'(n) - w''''(n) \quad (24)$$

The third processed signals r''', which comprise components $r_X'''$ and $r_Y'''$ in the X and Y polarizations, respectively, are inherently a substantially nonlinear function of the first processed signals r' because the difference operation 516 is a function of the third noise estimates w''', which in turn are a function of the second transmitted signal estimates s'' generated by the (substantially nonlinear) second decoding 332.

The signals 514 (i.e., the fourth noise estimates w'''') represent approximations of the noise signals w. By using these approximations to account for the contribution of w to the first processed signals r' 308, the variance of the noise contained in the third processed signals r''' 518 may be reduced relative to the variance of the noise contained in the first processed signals r' 308. Notably, however, the variance of the linear ISI contained in the third processed signals r''' 518 is not expected to be significantly greater than the variance of the linear ISI contained in the first processed signals r' 308. For example, the first processing 230 may generate first processed signals r' 308 having a first noise variance Vn1 and a first linear ISI variance Visi1, while the second processing 232 may generate third processed signals r''' 518 having a second noise variance Vn2 and a second linear ISI variance Visi2. According to some examples, the second processing 232 may achieve the effect that the second noise variance is significantly lower than the first noise variance, that is Vn2<<Vn1. According to some examples, the second processing 232 may further achieve the effect that the sum of the second noise variance and the second linear ISI variance is significantly lower than the sum of the first noise variance and the first linear ISI variance, that is Vn2+Visi2<<Vn1+Visi1. According to some examples, the second processing 232 may achieve the effect that the second linear ISI variance is approximately equal to or lower than the first linear ISI variance, that is Visi2<Visi1.

According to some examples, the third processed signals 518 may undergo third decoding 520, thereby resulting in the signals 240. In this example, the signals 240 are referred to as third transmitted signal estimates s' and comprise components $s_X'$ and $s_Y'''$ in the X and Y polarizations, respectively. Various types of decoding may be used to implement the third decoding 520. According to one example, where the third decoding 520 comprises two-dimensional decoding, a decoding operator D may be applied separately to the third processed signal components $r_X'''$ and $r_Y'''$ as shown in Equations 25:

$$s_X'''(n)=D(r_X'''(n))$$

$$s_Y'''(n)=D(r_Y'''(n)) \quad (25)$$

where the decoding operator D may be the same as or different from the ones used to implement the first decoding 310 and the second decoding 332.

Because the third processed signals r' 518 are expected to have reduced noise variance relative to the first processed signals r' 308, it is expected that the third transmitted signal estimates s' 240 will provide better approximations of the transmitted signals s than the first transmitted signal estimates s' 312 and the second transmitted signal estimates s'' 502.

According to some examples, the second processing 232 may comprise additional filtering and decoding steps to further reduce the noise in the signals 240 to which the FEC decoding is applied. The potential gains in performance afforded by these additional steps may be balanced against increased heat, cost, complexity, and processing delays.

Variations of the above examples may be applicable to particular situations or applications.

FIG. 6 illustrates an example method 600 for digital signal processing accordance with some examples of the technology disclosed herein. The method 600 may be performed at a receiver device, such as the receiver device 104 or 200.

At 602, the receiver device detects a received signal comprising a degraded version of a transmitted signal, the received signal suffering from degradations incurred over a communication channel, such as the communication channel 106 between the transmitter device 102 and the receiver device 104. According to some examples, the transmitted signal and the received signal are optical signals, and the degradations incurred over the communication channel include nonlinear channel effects such as PDL. According to one example, as described with respect to FIG. 2, the received optical signal 204 may be detected by a communication interface of the receiver device 200. The polarizing beam splitter 206 may split the optical signal 204 into the polarized components 208, which may be processed by the optical hybrid 210, thereby resulting in the optical signals 216. The photodetectors 218 may convert the optical signals 216 into the analog signals 220, and the ADCs 224 may generate the respective digital signals 226 from the analog signals 220. According to some examples, the received signal may be representative of data and FEC redundancy that is dependent on the data, the FEC redundancy having been generated as a result of the data having undergone FEC encoding, for example, at the transmitter device 102.

At 604, the receiver device applies first processing to a digital representation of the received signal to generate a first processed signal having first additive noise (with variance Vn1) and first linear ISI (with variance Visi1), where the first processing comprises a substantially linear operation designed to substantially minimize a sum of the variances of the first additive noise and the first linear ISI (i.e., to substantially minimize Vn1+Visi1). For example, the first processing applied at 604 may comprise the first processing 230 as described with respect to any one of FIGS. 2-5, which is performed by circuitry of the receiver device, such as the ASIC 222. The digital signals 226 generated by the ADCs 224 are examples of the digital representation of the received signal, while the signals 308 are examples of the first processed signals having the first additive noise and the first linear ISI. The substantially linear operation may comprise linear filtering, which may be implemented in the time domain or the frequency domain. For example, as previously described, the first filter 302 may be applied to the received signals 226 using a time-domain convolution, where the coefficients 306 of the first filter 302 may be calculated by the first coefficient calculation 304. According to some examples, the coefficients 306 may be calculated so as to satisfy Equation 8, such that the first filter 302 is configured to have an effect of substantially minimizing the sum of the first additive noise and the first linear ISI. According to some examples, the substantially linear operation may comprise filtering using a Wiener filter, a zero-forcing filter, a LMS algorithm, a CMA, or a RLS algorithm. According to some examples, the first additive noise may be substantially correlated over two or more dimensions, such as time or polarization or both. For example, as a result of PDL present in the received optical signal 204, the first processing 230 may generate first processed signals 308 containing significant noise correlation.

At 606, the receiver device applies second processing to the first processed signal to generate a second processed signal having second additive noise (with variance Vn2) and second linear ISI (with variance Visi2), where the second processing comprises a substantially nonlinear operation designed (i) to make a variance of the second additive noise substantially lower than the variance of the first additive noise (i.e., to make Vn2<<Vn1), and (ii) to make a sum of the variance of the second additive noise and a variance of the second linear ISI substantially lower than the sum of the variances of the first additive noise and the first linear ISI (i.e., to make Vn2+Visi2<<Vn1+Visi1). For example, the second processing applied at 606 may comprise the second processing 232 as described with respect to any one of FIGS. 2-5, which is performed by circuitry of the receiver device, such as the ASIC 222. Examples of the second processed signals generated at 606 include the signals 330 generated by the second processing 232 in the schematics 300 and 400 or the signals 518 generated by the second processing 232 in the schematic 500. An example of the substantially nonlinear operation is the first decoding 310 which, in combination with the difference operation 314 in the schematics 300 and 500 (or the channel error estimation 406 in the schematic 400), results in signals that are a substantially nonlinear function of the first processed signals 308.

According to some examples, the substantially nonlinear operation may comprise decoding a first estimate of the transmitted signal from the first processed signal, and generating an estimate of the first additive noise using the first processed signal and first estimate of the transmitted signal. For example, the first transmitted signal estimates 312 are decoded from the first processed signals 308 (as described with respect to the schematics 300, 400, and 500), and the first processed signals 308 are used together with the first transmitted signal estimates 312 to generate estimates of the first additive noise. According to the example schematics 300 and 500, the estimates of the first additive noise may be represented by the signals 316 and are generated using the difference operation 314. According to the example schematic 400, estimates of the first additive noise may be represented by signals 408 and are generated by the channel error estimation 406. The filtered signals 326 or 514 are also examples of estimates of the first additive noise.

According to some examples, the variance of the first linear ISI and the second linear ISI are substantially equal (i.e., Visi1≈Visi2).

According to some examples, the second processing applied at 606 comprises generating the second processed signal using the first processed signal and the estimate of the first additive noise, and decoding a second estimate of the transmitted signal from the second processed signal. For example, the signals 330 are generated using the first processed signals 308 and the estimates of the first additive noise 326. In this case, the second decoding 332 is an example of the decoding of the second estimate of the transmitted signal. In another example, the signals 518 are generated using the first processed signals 308 and the estimates of the first additive noise 506. In this case, the third decoding 520 is an example of the decoding of the second estimate of the transmitted signal.

According to some examples, the estimate of the transmitted signal that is generated by the second processing may undergo FEC decoding, such as the FEC decoding 250. That is, where the signal received at 602 is representative of data and FEC redundancy dependent on the data (in accordance with a FEC scheme implemented by transmitter/receiver pair), the receiver device may apply FEC decoding to a signal output by the second processing to generate an estimate of the data. The FEC decoding may be implemented in circuitry of the receiver device 200, such as the ASIC 222.

According to some examples, the second processing may not increase the overall time delay for signal processing in the receiver device. For example, a time delay incurred by applying the second processing to a single FEC block may be lower than a time delay incurred by applying the FEC decoding to the FEC block.

The scope of the claims should not be limited by the details set forth in the examples, but should be given the broadest interpretation consistent with the description as a whole.

What is claimed is:

1. A receiver device comprising:
a communication interface configured to detect a received signal comprising a degraded version of a transmitted signal, the received signal suffering from degradations incurred over a communication channel;
circuitry configured to apply first processing to a digital representation of the received signal to generate a first processed signal having first additive noise and first linear inter-symbol interference (ISI), the first processing comprising a substantially linear operation designed to substantially minimize a sum of variances of the first additive noise and the first linear ISI; and
circuitry configured to apply second processing to the first processed signal to generate a second processed signal having second additive noise and second linear ISI, the second processing comprising a substantially nonlinear operation designed (i) to make a variance of the second additive noise substantially lower than the variance of the first additive noise, and (ii) to make a sum of the variance of the second additive noise and a variance of the second linear ISI substantially lower than the sum of the variances of the first additive noise and first linear ISI.

2. The receiver device as claimed in claim 1, wherein the variances of the first linear ISI and the second linear ISI are substantially equal.

3. The receiver device as claimed in claim 1, wherein the substantially linear operation comprises linear filtering using a Wiener filter, a zero-forcing filter, a least mean squares (LMS) algorithm, a constant modulus algorithm (CMA), or a recursive least squares (RLS) algorithm.

4. The receiver device as claimed in claim 1, wherein the first additive noise is substantially correlated over two or more dimensions.

5. The receiver device as claimed in claim 1, wherein the substantially nonlinear operation comprises
decoding a first estimate of the transmitted signal from the first processed signal; and
generating an estimate of the first additive noise using the first processed signal and the first estimate of the transmitted signal.

6. The receiver device as claimed in claim 5, wherein generating the estimate of the first additive noise comprises calculating a difference between the first processed signal and the estimate of the transmitted signal.

7. The receiver device as claimed in claim 5, wherein the second processing comprises
generating the second processed signal using the first processed signal and the estimate of the first additive noise; and
decoding a second estimate of the transmitted signal from the second processed signal.

8. The receiver device as claimed in claim 7, wherein the received signal is representative of data and forward error correction (FEC) redundancy dependent on the data, the receiver device further comprising
circuitry configured to apply FEC decoding to the second estimate of the transmitted signal to generate an estimate of the data.

9. The receiver device as claimed in claim 8, wherein a time delay incurred by applying the second processing to a single FEC block is lower than a time delay incurred by applying the FEC decoding to the FEC block.

10. The receiver device as claimed in claim 1, wherein the transmitted signal and the received signal are optical signals, and wherein the degradations incurred over the communication channel comprise polarization dependent loss.

11. A method comprising:
 detecting a received signal comprising a degraded version of a transmitted signal, the received signal suffering from degradations incurred over a communication channel;
 applying first processing to a digital representation of the received signal to generate a first processed signal having first additive noise and first linear inter-symbol interference (ISI), the first processing comprising a substantially linear operation designed to substantially minimize a sum of variances of the first additive noise and the first linear ISI; and
 applying second processing to the first processed signal to generate a second processed signal having second additive noise and second linear ISI, the second processing comprising a substantially nonlinear operation designed (i) to make a variance of the second additive noise substantially lower than the variance of the first additive noise, and (ii) to make a sum of the variance of the second additive noise and a variance of the second linear ISI substantially lower than the sum of the variances of the first additive noise and first linear ISI.

12. The method as claimed in claim 11, wherein the variances of the first linear ISI and the second linear ISI are substantially equal.

13. The method as claimed in claim 11, wherein the substantially linear operation comprises linear filtering using a Wiener filter, a zero-forcing filter, a least mean squares (LMS) algorithm, a constant modulus algorithm (CMA), or a recursive least squares (RLS) algorithm.

14. The method as claimed in claim 11, wherein the first additive noise is substantially correlated over two or more dimensions.

15. The method as claimed in claim 11, wherein the substantially nonlinear operation comprises
 decoding a first estimate of the transmitted signal from the first processed signal; and
 generating an estimate of the first additive noise using the first processed signal and the first estimate of the transmitted signal.

16. The method as claimed in claim 15, wherein generating the estimate of the first additive noise comprises calculating a difference between the first processed signal and the estimate of the transmitted signal.

17. The method as claimed in claim 15, wherein the second processing comprises
 generating the second processed signal using the first processed signal and the estimate of the first additive noise; and
 decoding a second estimate of the transmitted signal from the second processed signal.

18. The method as claimed in claim 17, wherein the received signal is representative of data and forward error correction (FEC) redundancy dependent on the data, the method further comprising
 applying FEC decoding to the second estimate of the transmitted signal to generate an estimate of the data.

19. The method as claimed in claim 18, wherein a time delay incurred by applying the second processing to a single FEC block is lower than a time delay incurred by applying the FEC decoding to the FEC block.

20. The method as claimed in claim 11, wherein the transmitted signal and the received signal are optical signals, and wherein the degradations incurred over the communication channel comprise polarization dependent loss.

* * * * *